United States Patent [19]
Langer et al.

[11] 3,749,320
[45] July 31, 1973

[54] OXYGEN CUTTING AND WELDING TORCHES

[75] Inventors: Robert Marie Gerard Langer, Marly; Paulette Aimee Babon, Saint-Maurice-sur-Moselle, both of France

[73] Assignee: Epsilon S.A., Marly, France

[22] Filed: July 11, 1972

[21] Appl. No.: 270,644

[52] U.S. Cl............................... 239/416.1, 251/205
[51] Int. Cl................................................ B05b 7/12
[58] Field of Search...................... 239/413, 416.1; 251/205

[56] References Cited
UNITED STATES PATENTS

| | | | |
|---|---|---|---|
| 2,176,813 | 10/1939 | Hammon | 239/416.1 X |
| 3,279,701 | 10/1966 | Falk et al. | 239/413 |

*Primary Examiner*—Allen N. Knowles
*Attorney*—Joseph F. Brisebois et al.

[57] ABSTRACT

The invention relates to improved oxygen cutting and welding torches of the kind comprising a head providing a heating mixture of oxygen and a fuel gas such as propane, natural gas or acetylene, and a jet of cutting oxygen, and a handle provided with two cocks for regulating the flow rate of the heating oxygen and the fuel gas, and a clapper-type control-valve for the cutting oxygen, the construction of said regulating cocks being simplified and rendered fluid-tight by making each cock of the direct-passage type comprising a body of synthetic material such as poly-tetrafluoro-ethylene, this body being mounted in a hole perpendicular to the gas conduit and arranged so as to close this conduit, and having a cylindrical central bore and two opposite lateral openings connecting this bore to the gas conduit, a packing gland being fixed in said hole on the body of synthetic material, and a needle-valve moving in the central bore and screwing into the packing gland so as to provide regulation for the hardness of operation of the regulating cocks.

6 Claims, 2 Drawing Figures

PATENTED JUL 31 1973  3,749,320

OXYGEN CUTTING AND WELDING TORCHES

The invention relates to oxy-acetylene cutting and welding torches comprising a head which supplies a heating mixture of oxygen and fuel gas such as propane, natural gas or acetylene, and a jet of cutting oxygen, and a handle which comprises two cocke for adjusting the flow rate of the heating oxygen and the fuel gas and a clapper control valve for the cutting oxygen.

These torches of known type have a certain number of disadvantages.

In the first place, the regulating cocks which for safety reasons should be perfectly fluid-tight, have a complicated structure. In particular, they are generally provided with a number of fluid-tight washers, which is unfavorable from the point of view of reliability, production cost and overall size.

These cocks must furthermore be tightly screwed in order to obtain the required fluid-tightness. This frequently results in a certain hardness, that is to say a relatively considerable force must be applied in order to turn them.

The invention has for its object an oxygen cutting and welding torch of the type referred to above, in which the regulating cocks are of simple construction, and their hardness may be adjusted as desired by the user.

According to the invention, each regulating cock is of the direct passage type comprising a body of synthetic material such as poly-tetrafluoro-ethylene, the said body being arranged in a hole perpendicular to the conduit in such manner as to close this latter, and having a cylindrical central bore and two opposite lateral openings connecting the said central bore to the conduit, a packing gland fixed in the above hole on the body of synthetic material, and a cylindrical needle valve moving inside the central bore of the body and screwing into the said packing gland.

According to another characteristic feature of the invention, the two regulating cocks are arranged in front of the handle. This arrangement enables the safety to be increased since, when the regulating cocks are mounted behind the handle, in the event of leakage at the cocks, the gas is liable to accumulate inside the user's handle.

According to still a further feature of the invention, the heating mixture is produced inside the welding and oxygen cutting head. This also increases the safety, since no back-fires are to be feared.

The cutting oxygen is controlled by means of a needle-valve with a round extremity co-operating with a seating comprising a toric fluid-tightness joint, on which the needle-valve comes to rest in the closed position. The use of a needle-valve with a rounded extremity enables the pressure losses of the cutting oxygen in the control clapper-valve to be reduced.

The invention will be described in more detail hereinafter, reference being made to the accompanying drawings, in which.

Figure 2:
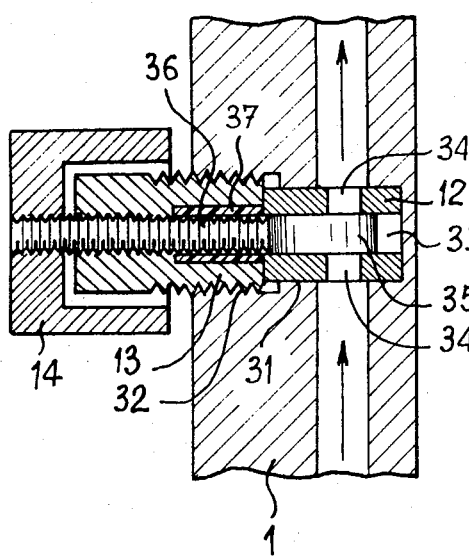
FIG. 2 is a view in cross-section of a regulating cock.

There can be seen in the drawings a body 1, made for example of stamped metal, which receives a supply conduit 2 for the combustion-supporting gas such as oxygen, and a supply conduit for fuel gas 3, generally acetylene, propane or natural gas. The combustion-supporting gas is sent, on the one hand into an outlet conduit 4 through the intermediary of a regulating cock 5 with a direct passage, and on the other hand into a conduit 6 for the outlet of cutting oxygen, through the intermediary of a branch conduit 18 and a clapper-valve 7. The outlet conduit 4 communicates with an annular housing 15 which is in turn connected to an outlet conduit 16.

The fuel gas is sent into an outlet conduit 24 through the intermediary of a second regulating cock 5' with a direct passage.

The outlet conduits for the cutting oxygen 6, the heating oxygen 16 and the heating fuel gas (not shown) are formed in a rod 26 which is fixed in a removable manner on the body 1 by means of the nut 27 or which may be fixed by brazing. The fluid-tightness between the various gas outlets is obtained by means of joints 21, 22 and 23.

The lance 26 carries at its other extremity a head which comprises a nozzle, in which is effected the heating mixture, and from which passes a central jet of cutting oxygen. The fact of effecting the mixture inside the head enables the anti-backfire devices to be eliminated, these devices being necessary in the case where the mixture is effected at the level of the handle.

Figure 1:
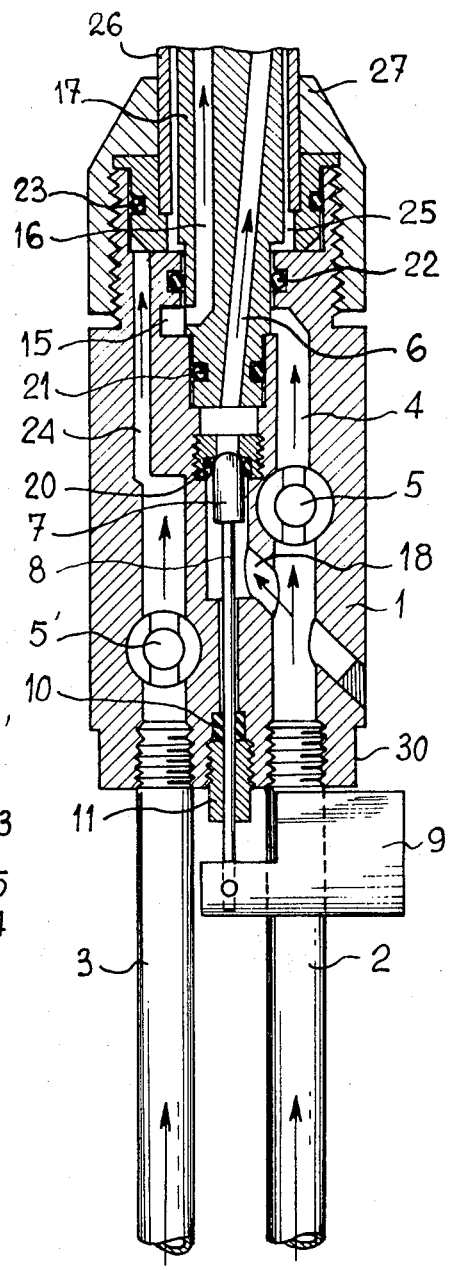
FIG. 1 is a view in cross-section of the front extremity of the handle of a torch according to the invention.

As can be seen from FIG.1, the two cocks 5 and 5' are arranged in front of the handle on the body 1. The handle is essentially composed of a sleeve (not shown) surrounding the conduits 2 and 3 and being fixed on a shoulder 30 of the body 1. This facilitates the regulation as compared with torches in which the adjustment is effected at the rear of the handle. Furthermore, in the event of leakage, the gases escape into the surrounding air instead of accumulating inside the handle of the operator, which may be very dangerous.

An important characteristic feature of the invention resides in the structure of the regulating cocks 5 and 5'. These are in fact composed of only four parts, and their construction is much more simple than that of the cocks employed at the present time.

These cocks 5 and 5' are of the direct-passage type and their structure is shown in detail in FIG. 2. The conduit is closed by a body 12 of synthetic material, such as poly-tetrafluoro-ethylene. This body 12, which may be of cylindrical external shape, is mounted in a blind hole 31 formed in the body 1 at right-angles to the gas conduit. The dimensions of this hole 31 are such that the body 12 is introduced into it with friction, so as to obtain good fluid-tightness. The closure body 12 is held inside the hole 31 by means of a threaded member 13 forming a packing gland and being screwed internally into the free extremity of the hole 31, which may advantageously have an internally-threaded enlarged section 32, intended to receive the packing gland 13.

The closure member 12 has a cylindrical central bore 33, in which slides a cylindrical needle-valve 35. The closure member further comprises two lateral openings 34 and 34' which permit the gas conduit to communicate with the central bore 33 on each side of the closure body 12. The central bore may pass entirely through the body 12, as shown in the drawing, or it may be closed on the inner side, that is to say on the side opposite to the packing gland 13.

The regulating needle-valve 34 is rigidly fixed on a threaded rod 36 which is screwed into a central hole 37 of the packing gland 13. A regulating knob 14 such as a knurled knob is fixed on the outer extremity of the rod 36, by brazing for example.

The mounting and operation of the regulating cock which has just been described are very simple. It is only necessary to engage the closure body in its housing and then to screw the assembly of the packing gland, the needle-valve and the knob into the threaded portion 32 of the hole 31. As soon as the body 12 is maintained, there is obtained adequate fluid-tightness. By tightening-up the packing gland 13 still more, the body 12 becomes expanded internally, which enables the "hardness" of the cock to be regulated.

Since the packing gland is screwed internally into the hole 31, the diameter of the cock is reduced, which gives more available space. Furthermore, the cock may be readily dismantled, for example in order to change the closure body if this proves necessary.

The control clapper-valve for the jet of cutting oxygen essentially comprises a needle-valve 7, also of poly-tetrafluoro-ethylene and operated by a rod 8 rigidly fixed to a trigger 9. This latter is slidably mounted on a gas-supply conduit, for example on the oxygen-supply conduit 2, and slides in a slot formed in the sleeve constituting the handle. The needle-valve comes to rest in the closure position against a seating of corresponding shape which is provided with a toric joint 20. This rounded form of the extremity of the needle-valve and its seating enables the pressure losses to be reduced in the cutting oxygen circuit.

Fluid-tightness of the passage of the rod 8 is obtained by means of a packing of poly-tetrafluoro-ethylene wool and a packing gland 11.

What we claim is:

1. An oxygen cutting and welding torch, comprising a head supplying a heating mixture of oxygen and a fuel gas such as propane, natural gas or acetylene, and a jet of cutting oxygen, and a handle provided with two cocks for regulating the flow-rate of said heating oxygen and said fuel gas, and a clapper-control-valve for said cutting oxygen; in which each said regulating cock is of the direct-passage type comprising a body of synthetic material such as poly-tetrafluoro-ethylene, said body being mounted in a hole perpendicular to the gas conduit so as to close said conduit, and having a cylindrical central bore and two opposite lateral openings connecting said central bore to said gas conduit, a packing gland fixed in said hole on the body of synthetic material, and a needle-valve adapted to move in the central bore of said body and screwing into said packing gland.

2. An oxygen cutting and welding torch as claimed in claim 1, in which said cylindrical needle-valve is rigidly fixed to an external regulating knob.

3. An oxygen cutting and welding torch as claimed in claim 1, in which said two regulating cocks are mounted in front of said handle.

4. An oxygen cutting and welding torch as claimed in claim 1, in which said control valve for the cutting oxygen comprises a needle-valve of which one extremity is rounded and the seating of which comprises a toric sealing joint on which said needle-valve rests in the closed position.

5. An oxygen cutting and welding torch as claimed in claim 1, in which said control valve for the cutting oxygen is rigidly fixed to a trigger slidably mounted on one of the gas supply tubes.

6. An oxygen cutting and welding torch as claimed in claim 1, in which said heating mixture is created in the head of said torch.

* * * * *